United States Patent
Von Gentzkow et al.

(10) Patent No.: US 6,465,702 B1
(45) Date of Patent: Oct. 15, 2002

(54) PROCESS FOR RECYCLING OF THERMOSET MATERIALS

(75) Inventors: Wolfgang Von Gentzkow, Kleinsendelbach; Dietrich Braun, Darmstadt; Arnd-Peter Rudolf, Schlüchtern, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/763,990

(22) PCT Filed: Aug. 16, 1999

(86) PCT No.: PCT/DE99/02560

§ 371 (c)(1),
(2), (4) Date: May 11, 2001

(87) PCT Pub. No.: WO00/12598

PCT Pub. Date: Mar. 9, 2000

(30) Foreign Application Priority Data

Aug. 27, 1998 (DE) .......................... 198 39 083

(51) Int. Cl.⁷ .................................................. C07C 4/22
(52) U.S. Cl. ...................................................... 585/241
(58) Field of Search .......................................... 585/241

(56) References Cited

FOREIGN PATENT DOCUMENTS

| EP | 0 953 418 | 11/1999 |
| WO | WO 96/16112 | 5/1996 |

OTHER PUBLICATIONS

Braun et al, "Chemische Untersuchungen zum Abbau vernetzter Phenol–Formaldehyd–Harze", *Die Angewandte Markromolekulare Chemie*, vol. 92, No. 1523 (1980), pp. 169–189.

Pott et al, "The Solution of Coal by Extraction under Pressure—The Hydrogenation of the Extract", *Fuel*, vol. XIII, No. 3 (1934), pp. 91–95.

Pott et al, "The Solution of Coal by Extraction under Pressure—The Hydrogenation of the Extract", *Fuel*, vol. XIII, No. 4 (1934), pp. 125–128.

Pott et al, "The Solution of Coal by Extraction under Pressure—The Hydrogenation of the Extract", *Fuel*, vol. XIII, No. 5 (1934), pp. 154–157.

*Primary Examiner*—Thuan D. Dang
(74) *Attorney, Agent, or Firm*—Morrison & Foerster, LLP

(57) ABSTRACT

A process for the feedstock recycling of thermoset materials treats the material with a partially hydrogenated aromatic hydrocarbon at a temperature of from 200 to 350° C. in the presence of an amine. In the case of epoxy resin materials an amine is not needed if processing is carried out at temperatures of from 300 to 350° C.

12 Claims, No Drawings

PROCESS FOR RECYCLING OF THERMOSET MATERIALS

The invention relates to a feedstock recycling process for thermoset materials.

An issue which is increasingly raised in the industrial use of plastics, alongside low-cost availability, good processing performance, and advantageous physical properties, is the destiny of the plastics after use. When considering desirable material usage cycles, the principle is: reuse is preferable to other recycling methods, which are preferable to disposal.

Since in many sectors of industry the reuse of plastics is severely restricted, the spotlight is being placed on the requirement for methods of recycling. In this connection, since they can be melted by heating, thermoplastics are in principle suitable for product recycling. However, materials which have been filled or reinforced, for example with glass fibers, give problems. In contrast, this procedure is impossible with thermosets, i.e. cured plastics which cannot be melted. But it is just these thermoset materials which are the materials of choice for many products in electrical engineering and electronics, since the materials have excellent mechanical and thermal properties. This is particularly true for fiber-reinforced materials and plastic-based composites.

In Germany some hundreds of thousands of metric tons of glass-fiber-reinforced plastics (GRPs) are processed every year. More than 50% of these GRP materials are thermoset materials. The resin systems used comprise amino resins, epoxy resins, phenolic resins, and unsaturated polyester resins. Epoxy resins have proven particularly successful for high-performance composite materials. Besides glass-fiber-reinforced epoxy resin materials, the materials used here include those reinforced with carbon fibers or with aramid fibers.

Since increased awareness of the environment means that in the future there will be regulations in almost every case requiring the manufacturer to take back used products, the producers of fiber-reinforced thermoset materials are increasingly also having to provide ways of recycling these materials.

Energetic recycling (incineration with regeneration of energy) has only limited advantages for fiber-reinforced or highly filled plastics, since the inert filler content and fiber content is up to 70% and has to be disposed of as waste, mostly as hazardous waste. In addition, incineration of halogen-containing plastics produces hydrogen halides, which require complicated removal by washing, and require neutralization.

Product recycling of thermoset materials is currently possible only in the form of particle recycling. For this, the materials have to be comminuted, ground, treated and fractionated, and, where appropriate, purified. In the case of printed circuit boards, the metallic particles have to be separated off from the fiber/plastic content. Proportions of up to 15% of the recycled plastic can then be mixed as a filler with thermoplastics or thermosets. Since the amount is limited to 15%, however, there is little opportunity to recycle returned parts; in most cases the process is therefore limited to the reincorporation of waste arising in situ during processing. Since the material cannot be recycled to a sufficient extent, there is clearly a need for feedstock recycling to be advanced beyond the initiatives seen hitherto.

Base chemicals in petrochemistry can be produced by degrading polymer structures, thus saving resources. The products obtained can then—directly or after treatment—be utilized as raw materials for plastics production. The available modes of feedstock recycling are as follows:

pyrolysis
gasification
hydrolysis and oxidation using sub- or supercritical water
hydrogenation Pyrolysis is thermal decomposition of organic compounds without a supply of oxygen, forming gases, condensable products, and solid, carbon-containing residues. It is carried out at temperatures of from 550 to 1100° C. The products obtained are pyrolysis gas, pyrolysis oil and pyrolysis coke, and the product specifications accessible here depend on the pyrolysis temperature range. Various pyrolysis plants using plastics, which have been in operation only for a short time, have shown that the pyrolysis oils which can be used for product recycling are rich in oxygen and thermally unstable, so that the process of treatment to give base materials for petrochemistry is relatively complicated. The yield of pyrolysis products which can be reused directly in the process of plastics production is presently about 33%.

Gasification involves partial oxidation. Here, plastic wastes are reacted with oxygen and, where appropriate, steam, as gasifier, at temperatures of from about 1300 to 1500° C. to give a mixture of carbon monoxide and hydrogen (synthesis gas), carbon dioxide, and also methane, ethylene, and acetylene. A solid residue of about 2% of carbon black with ash is left behind. The heat of reaction liberated means that the gasification process can be carried out autothermally. The synthesis gas, which still has about 75% of the energy content of the starting materials, can be used to prepare methanol and products derived from methanol.

The hydrolysis and oxidation of plastics using sub- or supercritical water takes place in a closed vessel at temperatures up to 500° C. and pressures up to 1000 bar. The supercritical point is at 374° C. At this temperature the pressure reached is 221 bar. Without oxidant it is solely hydrolysis which takes place. Controlled attack of water molecules at the linkage points in polycondensates causes them to cleave, enabling the starting materials to be reclaimed. Oxidants which may be used are air, oxygen, and hydrogen peroxide. These oxidize the organic skeleton of the plastic to give carbon dioxide and water. The nitrogen content in nitrogen compounds is converted into ammonia or nitrogen.

In hydrogenation, plastics wastes give fuels, heating oils, heating gases or petrochemical raw materials via addition reactions with hydrogen at temperatures up to 480° C. and pressures up to 300 bar. The yield achieved here of hydrogenated oils which can be treated in refineries of the usual type is about 80%. However, this yield can only be achieved if the plastics are processed together with oil residues (plastics content from 8 to 10%), and are used in a dechlorinated and dried condition.

The use of 1,2,3,4-tetrahydronapthalene (tetralin) as a hydrogen donor has been proposed as an alternative to pressure-hydrogenation with hydrogen for degrading crosslinked, i.e. fully cured, phenol-formaldehyde resins (see: D. Braun, R. Steffan, Angew. Makromol. Chem. 92 (1980), pages 169 to 189). This procedure corresponds to what is known as the Pott Broche process for extractive coal liquefaction (see: A. Pott, H. Broche, Fuel 13 (1934), pages 91 to 95, 125 to 128 and 154 to 157). This process can give a conversion of more than 90% in the liquefaction of coal with tetralin.

It has been found that when phenol-formaldehyde resins are cleaved by hydrogenolysis, these resins—in particle form (grain size ≦ 2 mm)—at temperatures of 410° C., using tetralin, are degraded within a period of 5 h predominantly to give low-molecular-weight, tetralin-soluble phenolic cleavage products. The pressures reached here are up to 26 bar. After cooling the pressure is only slightly superatmospheric, due to small proportions of gaseous cleavage products. Depending on the reaction time and reaction temperature, considerable amounts of insoluble, carbonized degradation products are obtained.

SUMMARY OF THE INVENTION

It is an object of the invention to provide a process which permits the feedstock recycling of thermoset materials, in particular of epoxy resin materials, under the mildest possible conditions with low energy cost and high yield of recycled base chemicals. A particular object here is to find a method which when used on composite thermoset materials even permits the components in the composite to be reclaimed in the purest possible form.

According to the invention, this is achieved by treating a thermoset material with a partially hydrogenated aromatic hydrocarbon—in the presence of an amine—at a temperature of from 200 to 350° C.

DESCRIPTION OF THE PREFERRED EMBODIMENTS

Specifically and surprisingly, it has been found that the hydrogenating, i.e. the hydrogenolytic cleavage, of thermoset materials, in particular composite thermoset materials, using a partially hydrogenated aromatic hydrocarbon—in the presence of a compound having an aminic structural unit—can give gentle but quantitative cleavage into low-molecular-weight compounds, even at temperatures as low as $\geq 200°$ C. This process firstly gives a saving in energy (lower costs) and secondly avoids formation of any tar- or pitch-like residues during the hydrogenolysis, since the conditions are mild. This means not only that the organic cleavage products are obtained at high concentrations, but also that embedded components and the components in the composite can be reclaimed quantitatively in pure form.

Thermosets are crosslinked plastics produced from curable resins. The invention is particularly applicable to thermoset materials based on the following industrially important groups of materials: amino resins, epoxy resins, phenolic resins, and unsaturated polyester resins. Epoxy resin materials are particularly advantageously subjected to this recycling process.

Examples of organic cleavage products reclaimed, almost quantitatively, during the recycling process are phenols when phenolic resins are used and phthalic acids when anhydride-cured epoxy resins are used. When epoxy resins cured with amines are used, high concentrations of amines are produced. Other materials obtained are benzene, phenol, cresols, and isopropanol, and also other monomers.

Another advantage of the invention is that the materials do not have to be in particle form, i.e. do not have to be comminuted prior to cleavage by hydrogenation, but can be used in the form of an entire component. This is particularly important for components which derive from electrical engineering or electronics and comprise a wide variety of different materials in combination with thermoset molded materials, in particular with epoxy resin molded materials. This method enables, for example, entire printed circuit board assemblies, casings, or modules of relatively large components to be introduced into the recycling process without complicated pretreatment. Another point of very great importance is that when carbon-fiber-reinforced thermoset materials are used the carbon fibers are reclaimed in pure form. It is very surprising, since the Pott-Broche process also hydrogenates carbon.

Particular partially hydrogenated aromatic hydrocarbons used, i.e. hydrogen donors, are 1,2,3,4-tetrahydronaphthalene (tetralin) and 9,10-dihydroanthracene. Partially hydrogenated aromatics which may be used as hydrogen donors in the cleavage by hydrogenation are generally those which have a high tendency to rearomatize. Examples of such compounds are fluorene, phenylene, xanthene, 7H-benzo[d,e]anthracene and indoline (2,3-dihydro-1H-indole). It is also advantageous to use mixtures of partially hydrogenated aromatic hydrocarbons. An example of a mixture of this type is one composed of indoline and 1,2,3,4-tetrahydronaphthalene.

In the process of the invention, the hydrogenolytic cleavage of the thermoset materials takes place in the presence of an amine or, respectively, of a compound having an aminic structural unit. It is possible to use an amine directly here. However, if the aromatic hydrocarbon itself contains an appropriate structural unit, as is in particular the case with indoline, then the addition of the additional amine can be dispensed with. It is also possible to dispense with any separate addition of an amine in cases where the thermoset material has an aminic structural unit and release of an amine is therefore possible during the cleavage by hydrogenation, as is in particular the case when using amine-cured epoxy resin molded materials.

The amines used may be aliphatic or aromatic mono-, di- or oligoamines, and these may be primary or secondary amines. Preferred amines used are ethanolamine and octylamine. The following compounds may also be used: nonylamine, decylamine, undecylamine, dodecylamine, cyclohexylamine, ethylenediamine, 1,3-diaminopropane, 1,3-diamino-2-propanol, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, 1,2-diaminocyclohexane, diethylenediamine, polyethyleneimine, tris-(2-aminoethyl)amine, bis-(3-aminopropyl)amine, O,O'-bis-(2-aminoethyl)-ethylene glycol, O,O'-bis-(2-aminoethyl)polyethylene glycol, piperazine, indoline, piperidine, benzylamine, aniline, diaminotoluene, diaminopyridine, 4,4'-diaminodicyclohexylmethane and 4,4'-diaminodiphenyl ether.

Surprisingly, it has also been found that epoxy resin materials themselves then undergo hydrogenolytic cleavage even if no amine or compound having an aminic structural unit is present. The invention therefore also provides a process for the feedstock recycling of thermoset materials based on epoxy resins, by treating an epoxy resin material with a partially hydrogenated aromatic hydrocarbon at a temperature of from 300 to 350° C. This therefore gives a way of recycling in particular anhydride-cured epoxy resin molded materials and, respectively, epoxy resin materials and composite epoxy resin materials, including those which comprise carbon fibers.

The extraordinary significance of the process of the invention lies in the fact that the thermoset materials are hydrogenated so gently that firstly feedstock recycling of the plastic components takes place and secondly that fillers or embedded components or components in the composite can be reclaimed and reused quantitatively and in pure form. In electronics and electrical engineering, this method also enables the metals used in electronic circuits to be regained in pure form. Another advantage of this process is that halogen-containing thermoset materials can also be used, but without hydrogen halides.

The cleavage by hydrogenation may take place at atmospheric pressure under reflux, or under pressure in a pressure vessel, depending on the hydrogen donor used and its boiling point. An example of a pressure vessel which may be used is an autoclave or a sealed tube. In the course of the cleavage of the thermoset material by hydrogenation a certain pressure builds up—temporarily—in the pressure vessel.

Materials which may be used in the process of the invention are cured thermoset molded materials per se and also filled molded materials. However, the use of composite materials is preferred, examples of the reclaimed materials then being glass fibers or glass-fiber fabrics. This process is moreover particularly important for composite thermoset materials, especially composite epoxy resin materials, which comprise carbon fibers, or carbon-fiber fabrics, or metals, such as gold or copper, or comprise components. In the feedstock recycling of materials of this type the components in the composite are regained in pure form.

The invention will be described in still further detail using working examples.

EXAMPLE 1

Cleavage of a phenol-formaldehyde-resin molded material by hydrogenation.

To produce a phenol-formaldehyde resin, 50 g of phenol, 57.2 ml of a 37% strength aqueous formaldehyde solution, and 2.5 g of $Ba(OH)_2 \cdot 8 H_2O$ are heated for 8 h, with stirring. The mixture was then neutralized by adding 10% strength sulfuric acid, $BaSO_4$ was filtered off, the water was distilled off in vacuo, and the sticky mass which remained was condensed for 5 h while slowly raising the temperature to 100° C. The resitol, which remained meltable, was cast onto an aluminum foil, hardened in vacuo for 2 h at 150° C., and then ground.

1 g of the phenol-formaldehyde resin was placed in a test tube together with 5 g of tetralin and 1 g of ethanolamine, and the test tube was heated in a sealed tube, using a heating jacket. The relevant temperature was set by means of an automated control system with thermal element, and controlled using a temperature sensor. The process of heating to a hydrogenation temperature in the range from 300 to 360° C., in order to determine the actual reaction temperature, took about 35 min. The reaction time for hydrogenation was defined as the period between reaching the set temperature and switching off the heating. The following values were determined for the vapor pressure p which became established in the sealed tube as a function of the temperature T:

| T in ° C. | 300  | 320  | 340   | 360   |
|-----------|------|------|-------|-------|
| P in bar  | 5.59 | 7.57 | 10.03 | 13.04 |

After a cooling period of about 6 h, the sealed tube was opened. This revealed only a small residual pressure, probably attributable to the formation of low-molecular-weight degradation products, such as hydrogen, methane, ethane, etc.

To determine the conversion as a function of temperature, the temperature in the sealed tube was varied in steps of 10° C. in the range from 300 to 350° C. and in each case held at the selected value for 5 h. This showed that a hydrogenation temperature of 330° C. gave quantitative conversion of the starting material into tetralin-soluble reaction products. Distillation of the tetralin solution gave considerable amounts of phenol, and also o-, m- and p-cresol.

EXAMPLE 2

Cleavage of an amine-cured, glass-fiber-reinforced epoxy resin molded material by hydrogenation The glass-fiber-reinforced epoxy resin molded material is a base material for printed circuit boards. To produce this material, 67 parts by weight of an epoxidized novolak were dissolved in a mixture made from 60% of methyl ethyl ketone and 40% of dimethylformamide, together with 33 parts by weight of polyarylamino isocyanurate (as hardener). A glass-fiber fabric saturated with this solution was processed to give prepregs, and the prepregs were used to produce the base material for printed circuit boards, by curing for two hours in a press at 180° C.

This material was comminuted in a granulator until the grain diameter was $\leq 2$ mm. 1 g of the ground product was placed in a test tube together with 5 g of tetralin, and the test tube was heated in a sealed tube at temperatures of from 290 to 350° C.—in steps of 10° C.—in each case for 5 h. It was found here that at a hydrogenation temperature as low as 320° C. the material gave over 99% degradation to give tetralin-soluble reaction products. The glass-fiber fabric is reclaimed here quantitatively in very pure form. From the tetralin solution it is possible to isolate considerable amounts of the valuable base chemical 2,4-diaminotoluene.

At temperatures $\geq 360°$ C., incidentally, increasing coking of the material is observed, the tetralin solubility of the reaction products is reduced to 95%, and the reclaimed glass fibers has black, tetralin-insoluble contamination.

In another experiment, 1 g of the ground material was heated at 280° C. for 5 h together with 5 g of tetralin and 1 g of octylamine, to convert the material quantitatively into tetralin-soluble products.

EXAMPLE 3

Cleavage of an amine-cured, glass-fiber-reinforced epoxy resin molded material by hydrogenation A piece of the base material for printed circuit boards from Example 2, measuring about 1×5 cm, not comminuted, was placed in a test tube and hydrogenated as in Example 2 using tetralin in a sealed tube. It was found that the material can also be hydrogenated and cleaved in this form. At a hydrogenation temperature of 320° C. and with a reaction time of 5 h, the tetralin-soluble fraction of the hydrogenation products is 99.3%. The glass-fiber fabric can be quantitatively reclaimed with negligible contamination.

EXAMPLE 4

Cleavage of an amine-cured, copper-containing epoxy resin molded material by hydrogenation A copper foil of 35 μm thickness was pressure-laminated to each side of prepregs of Example 2. This gave a copper-laminated base material for printed circuit boards.

In order to study the effect of the copper on the hydrogenation procedure, a piece of the material measuring about 1×5 cm was subjected to cleavage by hydrogenation in an autoclave with tetralin (reaction time: 5 h). It was found here that the material gave more than 99% degradation (tetralin-soluble fraction) at a hydrogenation temperature as low as 330° C. Both the glass-fiber fabric and the copper foils were reclaimed in very pure form.

In another experiment, the reaction time at 330° C. was varied. This showed that the reaction proceeds relatively slowly in the first 2 hours—due to the small surface area of the specimen. After about 2 h, the material then delaminates, and the resultant enlarged surface area sharply increases the hydrogenation rate, so that 99% of the material is soluble in tetralin after as little as 3 h.

EXAMPLE 5

Cleavage of an amine-cured, copper-containing epoxy resin molded material by hydrogenation A piece of the copper-laminated base material for printed circuit boards, as in Example 4, measuring about 1×5 cm, was mixed with 5 g of tetralin and 1 g of ethanolamine, and subjected to cleavage by hydrogenation in an autoclave at 280° C. After 4 h the material had been completely degraded and was soluble in tetrahydrofuran. The copper and the glass-fiber fabric could be reclaimed in a pure form.

In another experiment at 300° C., the cleavage by hydrogenation was terminated after 1 h. It was found here that the material was quantitatively converted into tetrahydrofuran-soluble constituents.

EXAMPLE 6

Cleavage of an amine-cured, copper-containing epoxy resin molded material by hydrogenation A piece of the copper-laminated base material for printed circuit boards, as in Example 4, measuring about 1×5 cm, was cleaved by hydrogenation in a nitrogen atmosphere, using 50 g of indoline at a temperature of 230° C. (reaction time: 6 h). Since indoline has a boiling point of 230° C., there is no need to use a pressure vessel. This gave a clear solution which became reddish after a short period of standing in air. The resin matrix, i.e. the epoxy resin molded material, was quantitatively converted into soluble products, and the copper and the glass-fiber fabric could be reclaimed in a pure form.

EXAMPLE 7

Cleavage of an amine-cured, copper-containing epoxy resin molded material by hydrogenation A piece of the copper-laminated base material for printed circuit boards, as in Example 4, measuring about 1×5 cm, was placed in a test tube together with 10 g of indoline and 20 g of tetralin, and cleaved by hydrogenation in a sealed tube at a temperature of 250° C. (reaction time: 20 h). The resultant clear solution became reddish once air had been admitted. The resin matrix, i.e. the epoxy resin molded material, was quantitatively converted into soluble products, and the copper and the glass-fiber fabric could be reclaimed without contamination.

EXAMPLE 8

Cleavage of an amine-cured, copper-containing epoxy resin molded material by hydrogenation A piece of the copper-laminated base material for printed circuit boards, as in Example 4, measuring about 1×5 cm, was heated in an atmosphere of nitrogen with 10 g of 9,10-dihydroanthracene, to a temperature of 300° C. Since 9,10-dihydroanthracene does not boil below 315° C., there is no need to use a pressure vessel. After about 20 h the material began to delaminate. After a further 8 h the entire resin matrix, i.e. the epoxy resin molded material, had been converted into soluble products. The copper and the glass-fiber fabric could be reclaimed in a pure form.

EXAMPLE 9

Cleavage of an amine-cured, halogen-containing epoxy resin molded material by hydrogenation A piece of copper-free commercially used FR4 printed circuit board material, measuring about 1×5 cm and of thickness 1.6 mm and containing about 10% of bromine—due to the component tetrabromobisphenol A—was heated—as in Example 8—in an atmosphere of nitrogen to a temperature of 310° C. with 10 g of 9,10-dihydroanthracene. After about 24 h the entire resin matrix, i.e. the epoxy resin molded material, had been converted into soluble products. The glass-fiber fabric could be reclaimed in a pure form. It was also found that no hydrogen bromide (HBr) was liberated under the reaction conditions prevailing during the cleavage by hydrogenation.

EXAMPLE 10

Cleavage of an amine-cured, carbon-fiber-reinforced epoxy resin molded material by hydrogenation For what is known as the RTM process, 20 parts by weight of glycidyl methanephosphonate, 20 parts by weight of the diglycidyl ester of bisphenol F, 25 parts by weight of epoxidized novolak, 10 parts by weight of the diglycidyl ester of butanediol, and 25 parts by weight of diaminodiphenylmethane were charged to a board mold which contained about 60% of carbon fibers in the form of a unidirectional mat. The board was cured at 160° C. for 5 h.

A piece of the board measuring about 1×5 cm was, as described in Example 3, was subjected to cleavage by hydrogenation at 320° C. for a period of 5 h, using tetralin. The resin matrix here was quantitatively converted into tetralin-soluble products. In contrast, the carbon fibers showed inert behavior and could be reclaimed quantitatively. No damage to the carbon fibers could be detected either under an optical microscope or under a scanning electron microscope. The tensile strength of the reclaimed carbon fibers, 3950 MPa, was practically the same as that of the fibers used to produce the molded material.

EXAMPLE 11

Cleavage of an anhydride-cured epoxy resin molded material by hydrogenation

A resin mixture made from 680 parts by weight of the diglycidyl ether of bisphenol A and 148 parts by weight of phthalic anhydride was cured in a mold at 180° C. for 2 h. To test the extent of degradation of the epoxy resin molded material by hydrogenation, it was comminuted in a granulator until the grain diameter was ≦2 mm. 1 g of this material was placed in a test tube together with 5 t of tetralin, and the test tube was heated in a sealed tube with a heating jacket.

To characterize the products produced, the reaction mixture was filtered with suction by way of a dried frit, and the residue was washed with tetrahydrofuran. After drying, the frit was weighed until its weight was constant, followed by determination of the tetralin-insoluble and, respectively, tetralin-soluble constituents.

To determine the conversion as a function of temperature, the temperature in the sealed tube was varied in steps of 10° C. in the range from 300 to 350° C., and in each case held for 5 h at the selected value. It was found here that about 84% of the starting material was converted into tetralin-soluble reaction products at a hydrogenation temperature of 340° C. The insoluble fraction (16%) is pure phthalic acid in the form of colorless needles. This means that the conversion is practically 100% at a reaction temperature of 340° C.

Besides the phthalic acid (with quantitative reclamation) it was also possible to isolate considerable amounts of isopropanol, benzene, phenol, isopropylphenol, and cresols from the reaction mixture—by distillation and extraction.

In order to determine the reaction time required for optimum hydrogenation, the reaction time was varied from 1 to 5 h at a temperature of 350° C. It was found here that a reaction time of 2 h is sufficient to hydrogenate the reaction resin molded material quantitatively and to form tetralin-soluble reaction products and phthalic acid.

We claim:

1. A process for the feedstock recycling of thermoset materials comprising providing a first material selected from a group consisting of an amine, a compound having an aminic structural unit and an amine and a compound having an aminic structural unit, and treating a thermoset material with a partially hydrogenated aromatic hydrocarbon in the presence of the first material at a temperature of from 200° C. and 350° C.

2. A process according to claim 1, wherein the thermoset material is an epoxy resin.

3. A process according to claim 2, wherein the amine is selected from ethanolamine and octylamine.

4. A process according to claim 1, wherein the amine is selected from ethanolamine and octylamine.

5. A process according to claim 1, wherein the thermoset material is treated with indoline.

6. A process according to claim 1, wherein the partially hydrogenated aromatic hydrocarbon is selected from 1,2,3,4-tetrahydronaphthalene and 9,10-dihydroanthracene.

7. A process according to claim 1, wherein the thermoset material is a composite thermoset material.

8. A process according to claim 6, wherein the composite thermoset material includes carbon fibers.

9. A process for the feedstock recycling of thermoset materials containing epoxy resins comprising treating the thermoset material with a partially hydrogenated aromatic hydrocarbon at a temperature of from 300° C. to 350° C.

10. A process according to claim 9, wherein the partially hydrogenated aromatic hydrocarbon is selected from 1,2,3,4-tetrahydronaphthalene and 9,10-dihydroanthracene.

11. A process according to claims 9, wherein the thermoset material is a composite thermoset material.

12. A process according to claim 11, wherein the composite thermoset material includes carbon fibers.

* * * * *